(12) United States Patent
Mathew et al.

(10) Patent No.: US 11,316,797 B2
(45) Date of Patent: Apr. 26, 2022

(54) QUEUE FILTER CONFIGURATION FOR MULTICAST PACKET HANDLING

(71) Applicant: VMware, Inc., Palo Alto, CA (US)

(72) Inventors: Subin Cyriac Mathew, Palo Alto, CA (US); Aditya Gajanana Holla, Palo Alto, CA (US); Chidambareswaran Raman, Palo Alto, CA (US); Senthilkumar Karunakaran, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/043,165

(22) Filed: Jul. 24, 2018

(65) Prior Publication Data
US 2020/0036646 A1   Jan. 30, 2020

(51) Int. Cl.
| H04L 12/863 | (2013.01) |
| H04L 12/24 | (2006.01) |
| H04L 47/6295 | (2022.01) |
| H04L 41/0813 | (2022.01) |
| H04L 49/201 | (2022.01) |
| H04L 12/46 | (2006.01) |
| H04L 45/64 | (2022.01) |
| H04L 45/16 | (2022.01) |
| G06F 9/455 | (2018.01) |

(52) U.S. Cl.
CPC ...... *H04L 47/6295* (2013.01); *H04L 12/4633* (2013.01); *H04L 12/4641* (2013.01); *H04L 41/0813* (2013.01); *H04L 45/16* (2013.01); *H04L 45/64* (2013.01); *H04L 49/201* (2013.01); *G06F 9/45558* (2013.01); *G06F 2009/45595* (2013.01)

(58) Field of Classification Search
CPC . H04L 41/0803; H04L 45/54; H04L 47/6255; H04L 63/0272; H04L 49/3045
See application file for complete search history.

(56) References Cited

U.S. PATENT DOCUMENTS

| 7,478,173 | B1 | 1/2009 | Delco |
| 8,619,771 | B2 | 12/2013 | Lambeth et al. |
| 9,014,007 | B2 | 4/2015 | Bhikkaji et al. |
| 9,306,837 | B1 | 4/2016 | Jain et al. |
| 9,350,657 | B2 | 5/2016 | Gross, IV et al. |
| 9,356,866 | B1 * | 5/2016 | Sivaramakrishnan ............... H04L 45/586 |
| 9,432,204 | B2 | 8/2016 | Shen et al. |

(Continued)

*Primary Examiner* — Romani Ohri
(74) *Attorney, Agent, or Firm* — Su IP Consulting

(57) ABSTRACT

Example methods are provided for a host to perform queue filter configuration for multicast packet handling in a software-defined networking (SDN) environment. One example method may comprise the host generating and sending a request to join an outer multicast group address to one or more multicast-enabled network devices; and configuring a queue filter based on the outer multicast group address. In response to detecting an ingress encapsulated multicast packet that includes an outer header addressed to the outer multicast group address, the host may assign the ingress encapsulated multicast packet to a particular NIC queue from the multiple NIC queues based on the queue filter; and retrieving, from the particular NIC queue, the ingress encapsulated multicast packet to generate and send a decapsulated multicast packet to a virtualized computing instance.

21 Claims, 8 Drawing Sheets

(56) References Cited

U.S. PATENT DOCUMENTS

| | | |
|---|---|---|
| 10,567,187 B2 | 2/2020 | Mathew et al. |
| 10,649,805 B1 | 5/2020 | Mishra et al. |
| 2003/0217183 A1* | 11/2003 | Rimmer ............... H04L 45/742 709/249 |
| 2003/0231629 A1 | 12/2003 | Banerjee et al. |
| 2005/0138369 A1* | 6/2005 | Lebovitz ............... H04L 63/08 713/163 |
| 2006/0184695 A1 | 8/2006 | Monette et al. |
| 2007/0104192 A1 | 5/2007 | Yoon et al. |
| 2007/0183418 A1 | 8/2007 | Riddoch et al. |
| 2007/0217416 A1 | 9/2007 | Okuda |
| 2011/0085548 A1 | 4/2011 | Fernández Gutiérrez |
| 2012/0281697 A1 | 11/2012 | Huang |
| 2014/0192804 A1* | 7/2014 | Ghanwani ............. H04L 12/18 370/390 |
| 2014/0314079 A1* | 10/2014 | Jain ..................... H04L 45/16 370/390 |
| 2015/0009992 A1 | 1/2015 | Zhang |
| 2015/0103679 A1* | 4/2015 | Tessmer ................ H04L 43/50 370/252 |
| 2015/0124586 A1 | 5/2015 | Pani |
| 2015/0127701 A1 | 5/2015 | Chu et al. |
| 2015/0236871 A1 | 8/2015 | Kang |
| 2016/0094353 A1 | 3/2016 | Sreeramoju et al. |
| 2016/0232019 A1* | 8/2016 | Shah ................. G06F 9/45558 |
| 2016/0285641 A1 | 9/2016 | He et al. |
| 2017/0237650 A1 | 8/2017 | Meeram et al. |
| 2017/0250954 A1* | 8/2017 | Jain ................... H04L 63/0254 |
| 2017/0302464 A1 | 10/2017 | Hu et al. |
| 2018/0006930 A1* | 1/2018 | Du ........................ H04L 67/28 |
| 2018/0159771 A1* | 6/2018 | Malloy ................ H04L 45/745 |
| 2018/0167320 A1 | 6/2018 | Huang et al. |
| 2018/0234259 A1 | 8/2018 | Du et al. |
| 2018/0270146 A1 | 9/2018 | Jiang et al. |
| 2019/0068555 A1* | 2/2019 | Tsirkin .................. H04L 63/20 |
| 2019/0081899 A1* | 3/2019 | Mundkur ............. H04L 47/822 |
| 2019/0132286 A1* | 5/2019 | Holla .................. H04L 67/322 |
| 2019/0273625 A1 | 9/2019 | Tessmer et al. |
| 2020/0036552 A1 | 1/2020 | Boutros et al. |

\* cited by examiner

Encapsulated multicast packet with outer header (O) addressed to IP-OUT1 and MAC-OUT1

Encapsulated multicast packet with outer header (O) addressed to IP-OUT2 and MAC-OUT2

QUEUE FILTER CONFIGURATION FOR MULTICAST PACKET HANDLING

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, multicasting refers to the transmission of information from a source to a group of destinations simultaneously. In an SDN environment, the processing of multicast packets may be limited by the underlying hardware, which may adversely affect throughput and performance.

DETAILED DESCRIPTION

Figure 1:
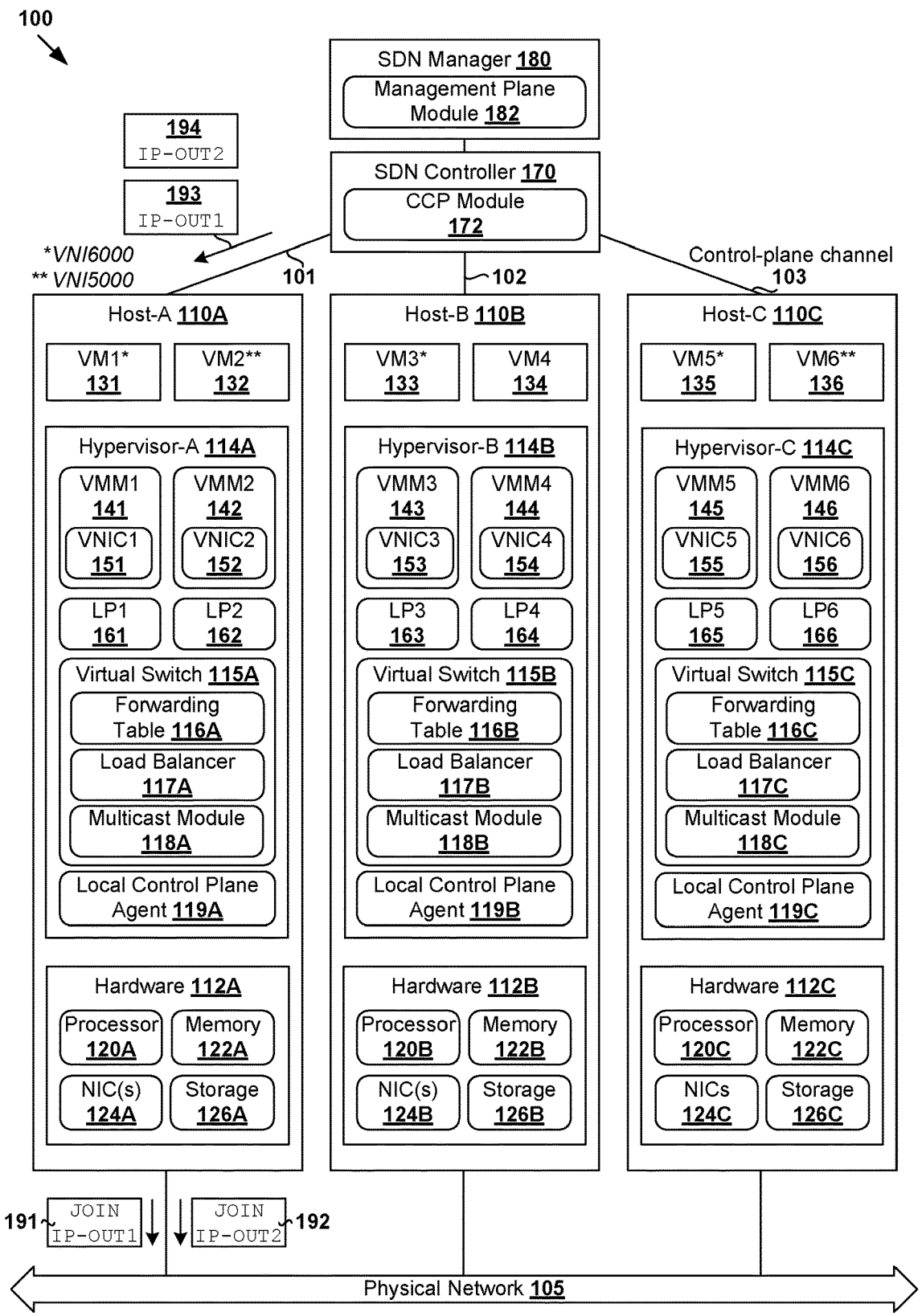
FIG. 1 is a schematic diagram illustrating an example Software-Defined Networking (SDN) environment in which queue filter configuration for multicast packet handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to multicast packet handling will now be explained in more detail using FIG. 1, which is a schematic diagram illustrating example Software-Defined Networking (SDN) environment 100 in which queue filter configuration for multicast packet handling may be performed. It should be understood that, depending on the desired implementation, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications (not shown for simplicity). Corresponding to hardware 112A/112B/112C, the virtual resources may include virtual CPU, guest physical memory, virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C further implements virtual switch 115A/115B/115C and a logical distributed router (DR) instance (not shown for simplicity) to handle egress packets from, and ingress packets to, corresponding VMs 131-136. In SDN environment 100, logical switches and logical distributed routers may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 115A/115B/115C also maintains any suitable information to forward packets to and from corresponding VMs 131-136. Packets are received from, or sent to, each VM via an associated logical port. For example, logical ports 161-166 are associated with respective VMs 131-136. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 170 and SDN manager 180 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100.

SDN controller 170 and SDN manager 180 support central control plane (CCP) module 172 and management plane module 182, respectively. To send and receive the control information (e.g., configuration information), each host 110A/110B/110C may implement local control plane (LCP) agent 119A/119B/119C to interact with SDN controller 170. For example, control-plane channel 101/102/103 may be established between SDN controller 170 and host 110A/110B/110C using TCP over Secure Sockets Layer (SSL), etc. Management entity 170/180 may be implemented using physical machine(s), virtual machine(s), a combination thereof, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 on host-B 110B and VM5 135 on host-C 110C may be located on the same logical layer-2 segment, such as VXLAN segment with VXLAN network identifier (VNI)=6000. VM2 132 and VM6 136 may be located on a different segment, such as VNI=5000.

Each host 110A/110B/110C also maintains data-plane connectivity with other host(s) via physical network 105 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=100). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 105.

Figure 2:
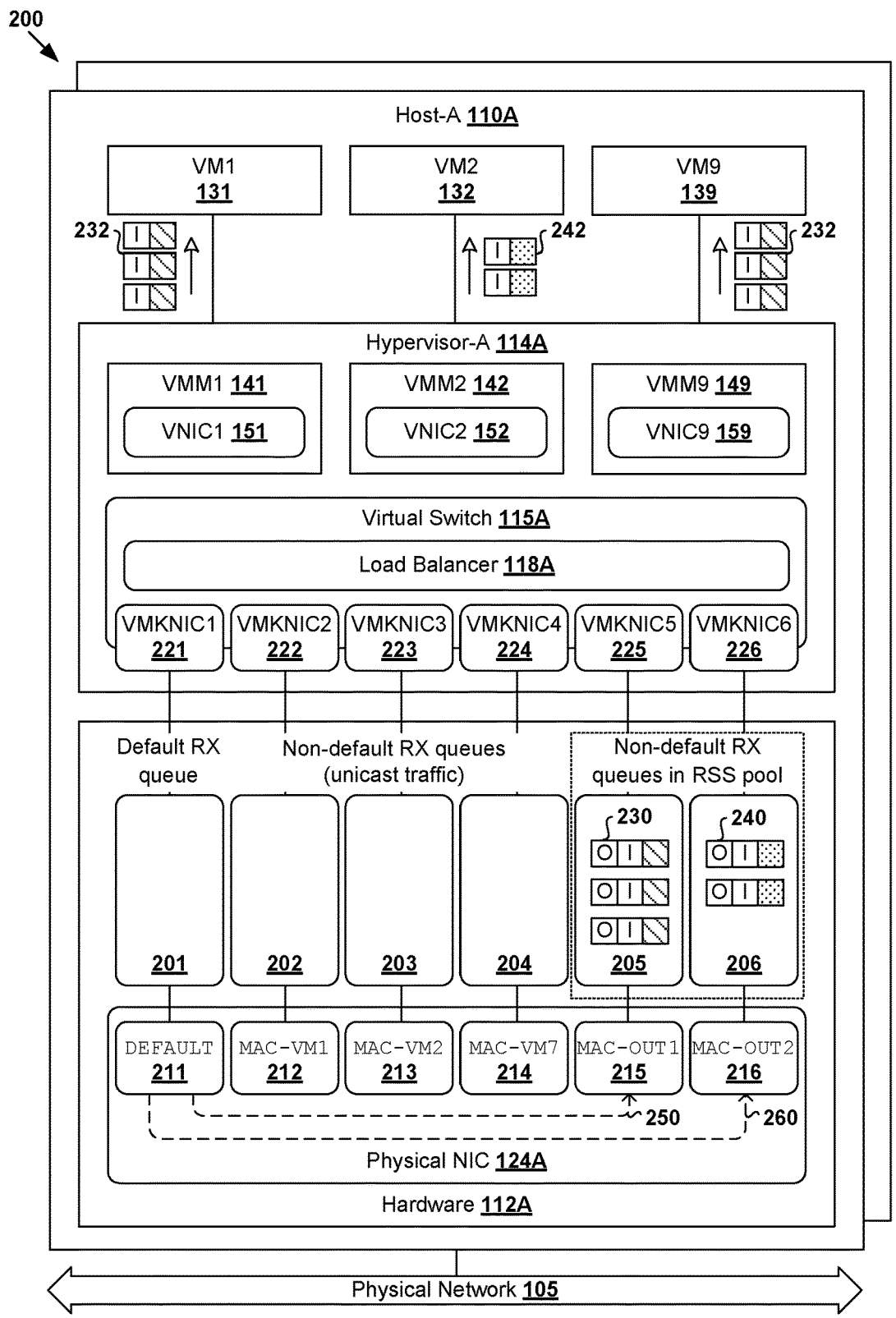
FIG. 2 is a schematic diagram illustrating an example host to perform queue filter configuration for multicast packet handling in an SDN environment.
Figure 2:
Figure 2:

In practice, physical NIC 124A/124B/124C may include multiple NIC queues (i.e., hardware queues) for holding incoming packets that are received from physical network 105. In more detail, FIG. 2 is a schematic diagram illustrating an example host to perform queue filter configuration for multicast packet handling in SDN environment 100. Using host-A 110A as an example, physical NIC 124A may support multiple NIC queues, including default receive (RX) queue 201, non-default RX queues 202-204 configured for handling unicast traffic, non-default RX queues 205-206 belonging to a Receive Side Scalling (RSS) pool, etc. In practice, the term "RSS" may refer to a network driver technology or feature that allows distribution based on flows to leverage parallelism across multiple CPUs in multiprocessor systems.

Ingress traffic may be distributed among different NIC queues 201-206 using queue filters 211-216. Each NIC queue is generally supported by a separate thread for packet processing. A queue filter may be defined using any suitable attribute, such as a destination address (e.g., destination Media Access Control (MAC) address, destination Internet Protocol (IP) address, etc.), five-tuple information of a communication flow (e.g., source IP address, destination IP address, source port number, destination port number, protocol, etc.), overlay network information (e.g., logical network identifier), any combination thereof, etc. The attribute(s) may be matched against packet header information in outer header(s) and/or inner header(s). NIC queues 201-206 are connected to virtual switch 115A via respective virtual network interfaces labelled "VMKNIC1" to "VMKNIC6"; see 221-226. Although not shown for simplicity, physical NIC 124A may support transmit (TX) queues for egress traffic.

NIC queues 201-206 facilitate multi-core processing of VM traffic. For example, at the instruction of load balancer 117A at hypervisor-A 114A (e.g., using NetQueue commands in the ESX® product family available from VMware, Inc.), physical NIC 124A may allocate one RX queue for each VM. In practice, NetQueue load balancer may perform RX queue allocation to filters dynamically using any suitable algorithm(s). For example in FIG. 2, first queue filter 212 specifying MAC address=MAC-VM1 associated with VM1 131 is configured for first non-default RX queue 202. Second queue filter 213 specifying MAC address=MAC-VM2 associated with VM2 132 is configured for second non-default RX queue 203. Third queue filter 214 specifying MAC address=MAC-VM9 associated with VM9 139 is configured for third non-default RX queue 204. VM9 139 (not shown in FIG. 1) is associated with VNIC9 159 emulated using VMM9 149.

According to queue filters 212-214, unicast packets addressed to the same destination MAC address will be handled by a single queue. The VM-specific queuing mechanism offloads the burden of sorting incoming packets based on their destination VMs from a host's CPU (e.g., 120A) to the physical NIC (e.g., 124A), hence significantly reducing the processing overhead on the CPU. In addition, when the packets stored in these separate RX queues are processed by hypervisor 114A, multiple processors (for example, processors in a multi-core CPU) can be used. This multi-core processing capability can improve the network throughput for unicast packets.

Conventionally, however, multicast packets are processed using a single queue, which is usually default RX queue 201. This often results in poor performance due to poor RX throughput for multicast packets. For example, default RX queue 201 generally has limited size. When default RX queue 201 is full, tail drop of multicast packets will occur, which is undesirable.

Queue Filter Configuration

According to examples of the present disclosure, multicast packet handling in SDN environment 100 may be improved using queue filter configuration. In particular, by configuring a queue filter based on an outer multicast group address, ingress encapsulated multicast packets that are addressed to the outer multicast group address may be assigned to one of NIC queues 201-206 to improve RX throughput. As will be described further below, queue filters may be configured, and removed, dynamically to improve efficiency and packet performance in SDN environment 100.

Figure 3:
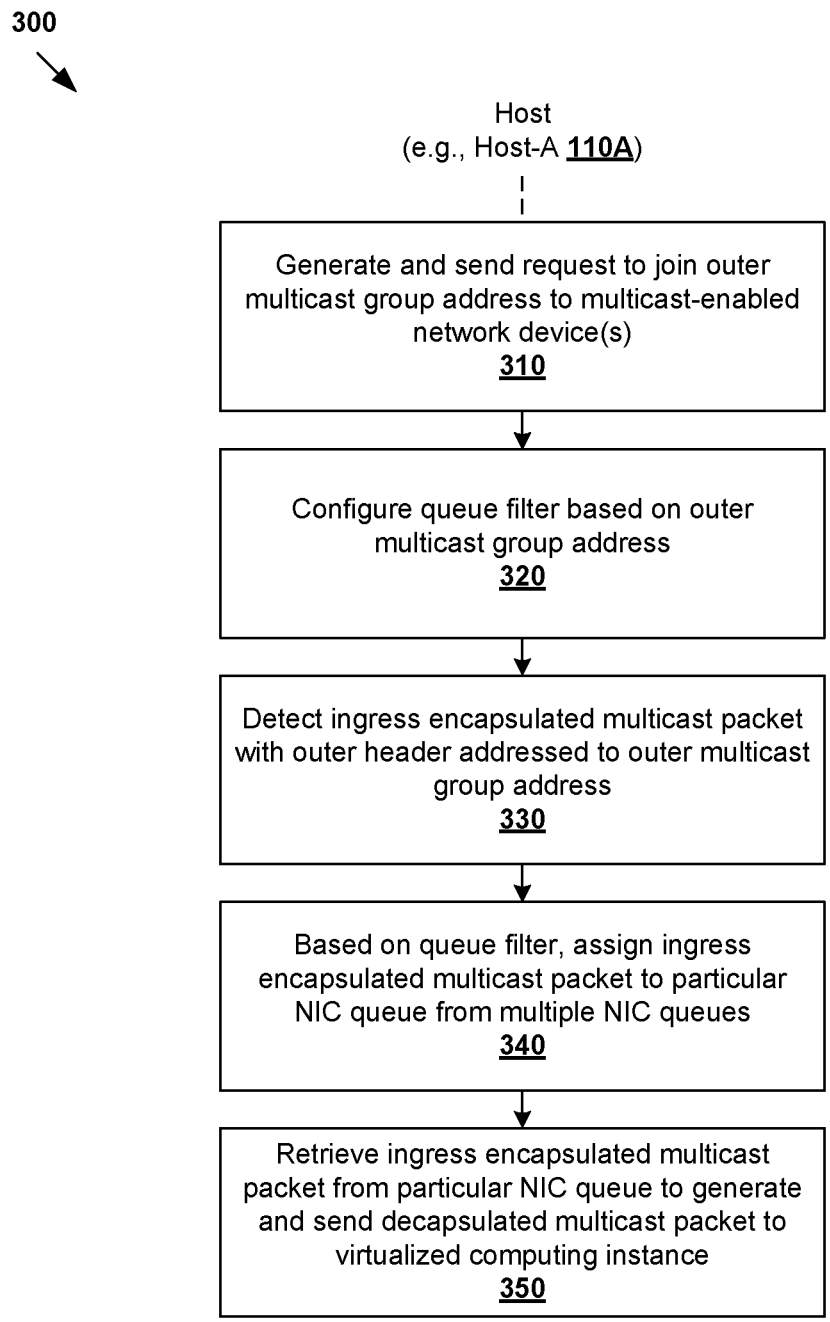
FIG. 3 is a flowchart of an example process for a host to perform queue filter configuration for multicast packet handling in an SDN environment.

In more detail, FIG. 3 is a flowchart of example process 300 for a host to perform multicast packet handling in an SDN environment. Example process 300 may include one or more operations, functions, or actions illustrated by one or more blocks, such as 310 to 350. The various blocks may be combined into fewer blocks, divided into additional blocks, and/or eliminated depending on the desired implementation. In practice, example process 300 may be implemented by any suitable hypervisor 114A/114B/114C supported by host 110A/110B/110C, such as using load balancer 117A/117B/117C and/or multicast module 118A/118B/118C at virtual switch 115A/115B/115C. In the following, an example will be explained using host-A 110A as an example "host," VM1 131 as example "virtualized computing instance" and SDN controller 170 as example "management entity."

At 310 in FIG. 3, host-A 110A generates and sends a request to join an outer multicast group address to multicast-enabled network device(s) that are capable of multicast forwarding based on the outer multicast group address. Referring to the example in FIG. 1, host-A 110A may generate and send first request 191 to join first outer multicast group address=IP-OUT1, and second request 192 to join second outer multicast group address=IP-OUT2.

In practice, block 310 may be performed in response to any suitable event. In a first example to be discussed using FIG. 4 to FIG. 7, first request 191 may be generated and sent in response to detecting, from VM1 131 or VM9 139, a request to join a first inner multicast group address=IP-IN1 to which IP-OUT1 is assigned. Second request 191 may be generated and sent in response to detecting, from VM2 132, a request to join a second inner multicast group address=IP-IN2 to which IP-OUT2 is assigned.

Figure 8:
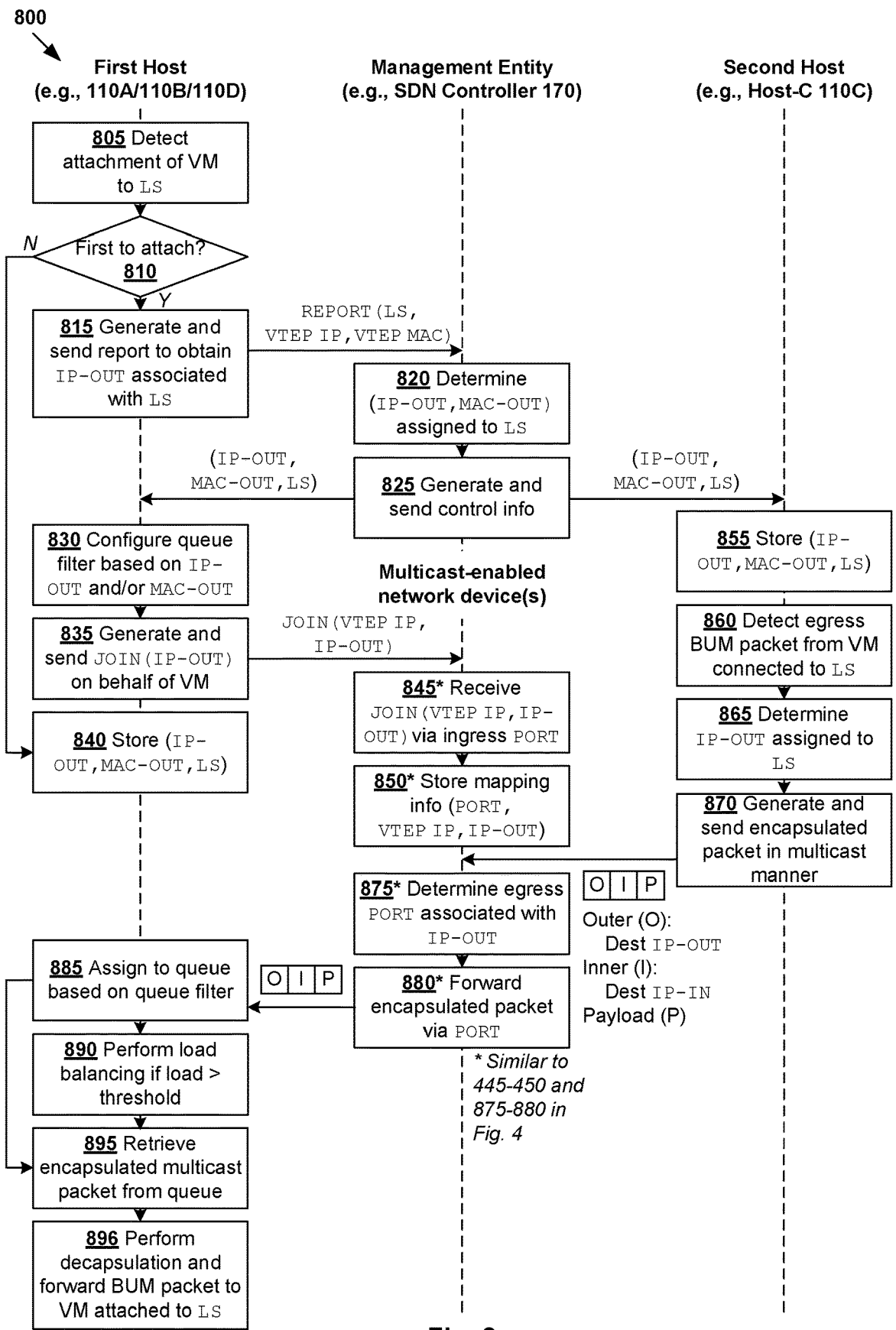
FIG. 8 is a flowchart of a second example detailed process of queue filter configuration for multicast packet handling in an SDN environment.

In a second example to be discussed using FIG. 8, host-A 110A may generate and send first request 191 in response to detecting an attachment of VM1 131 to a first logical switch=LS1 to which IP-OUT1 is assigned. Second request 192 may be generated and sent in response to detecting an attachment of VM2 132 to a second logical switch=LS2 to which IP-OUT2 is assigned. In practice, the outer multicast group address may be obtained by generating and sending a report to SDN controller 170 to cause the SDN controller 170 to assign the outer multicast group address (see also 193-194 in FIG. 1).

At 320 in FIG. 3, host-A 110A configures a queue filter based on the outer multicast group address. Referring to the example in FIG. 2, host-A 110A configures first queue filter 215 specifying first multicast group MAC address=MAC-OUT1 associated with IP-OUT1. At 330 and 340, in response to detecting ingress encapsulated multicast packet 230 that includes an outer header addressed to IP-OUT1 from multicast-enabled network device(s) in physical network 105, host-A 110A (e.g., physical NIC 124A) assigns ingress encapsulated multicast packet 230 to NIC queue 205 in the RSS pool based on first queue filter 215. At 350, host-A 110A (e.g., multicast module 118A) retrieves ingress encapsulated multicast packet 230 to generate and send decapsulated multicast packet 232 to VM1 131. In the example in FIG. 2, VM9 139 is also a receiver of decapsulated multicast packet 232. Note that block 310 may be performed before, after or in parallel with block 320.

Blocks 320-350 in FIG. 3 may be repeated for second outer multicast group address=IP-OUT2. As shown in FIG. 2, host-A 110A configures second queue filter 216 specifying MAC address=MAC-OUT2 associated with IP-OUT2. In response to detecting ingress encapsulated multicast packet 240 that includes an outer header addressed to IP-OUT2, host-A 110A (e.g., physical NIC 124A) assigns ingress encapsulated multicast packet 240 to NIC queue 206 in the RSS pool based on second queue filter 216. Next, host-A 110A (e.g., multicast module 118A) retrieves ingress encapsulated multicast packet 240 to generate and send decapsulated multicast packet 242 to VM2 132. By using different queues 205-206 instead of a single default queue, parallel processing that takes advantage of different CPU cores of host-A 110A may be achieved, thereby improving throughput.

Although queue filters 215-216 are configured based on respective MAC addresses MAC-OUT1 and MAC-OUT2, it should be understood that any alternative and/or additional attribute(s) may be used. For example, queue filters 215-216 may be configured based on respective outer multicast group IP addresses IP-OUT1 and IP-OUT2, or a combination of the outer multicast group IP and MAC addresses. As will be described using FIG. 4 to FIG. 8, queue filter 215/216 may be initially configured for default NIC queue 201. As the load associated with queue filter 215/216 increases (e.g., exceeds a predetermined threshold), load balancing may then be performed to move queue filter 215/216 from default NIC queue 201 to non-default queue 205/206 with RSS feature in the RSS pool. Since RSS queues 205-206 are mapped to multiple hardware queues, they are suitable for high-throughput multicast applications. When host-A 110A leaves IP-OUT1 or IP-OUT2, corresponding queue filter 215/216 may be removed.

According to examples of the present disclosure, a queue filter may be dynamically configured and removed as multicast group membership changes in SDN environment 100. For example, a queue filter may be configured when a host supports a new receiver of an outer multicast group address, such as when a VM joins an inner multicast group address associated with the outer multicast group address (see FIGS. 4-7), the VM attaches to a logical switch (see FIG. 8), etc. The queue filter may be removed when a host no longer supports any receiver of the outer multicast group address (e.g., no more inner multicast address mapped to the outer multicast group address), or there is no VM attached to the logical switch. Since the number of configurable queue filters is generally limited, dynamic configuration and removal of queue filters may be performed to improve utilization and performance. In the following, various examples will be discussed using FIG. 4 to FIG. 8.

Detailed Process

Figure 4:
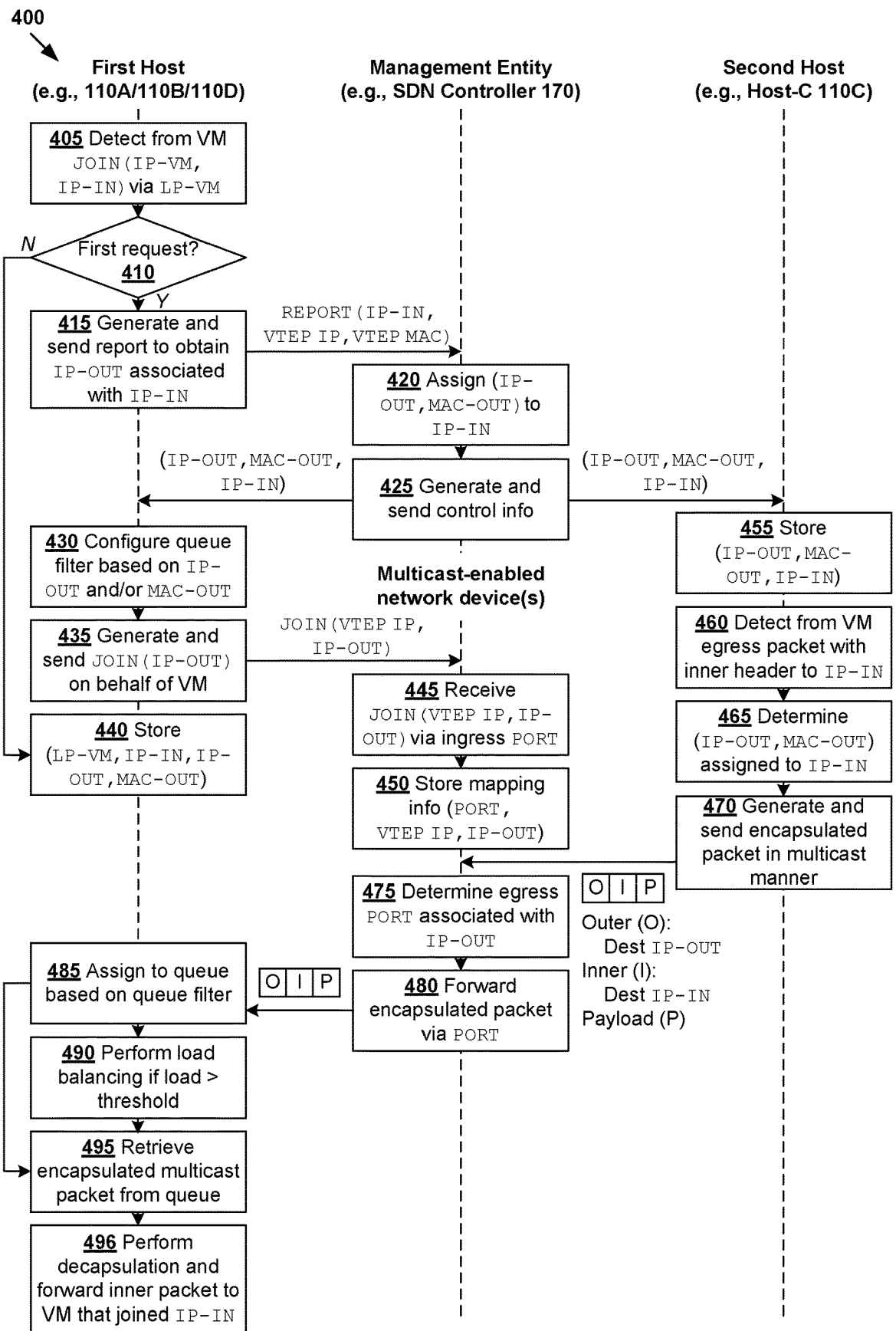
FIG. 4 is a flowchart of a first example detailed process of queue filter configuration for multicast packet handling in an SDN environment.

FIG. 4 is a flowchart of first example detailed process 400 of queue filter configuration for multicast packet handling in SDN environment 100. Example process 400 may include one or more operations, functions, or actions illustrated by one or more blocks, such as 405 to 496. The various blocks may be combined into fewer blocks, divided into additional blocks, and/or eliminated depending on the desired implementation. In the following, example process 400 will be explained using host 110A/110B/110D as an example "first host," host-C 110C as an example "second host," and SDN controller 170 as an example "management entity." In practice, examples of the present disclosure may be implemented by hosts 110A-D using respective load balancers 117A-D and multicast modules 118A-D, etc.

Figure 5:
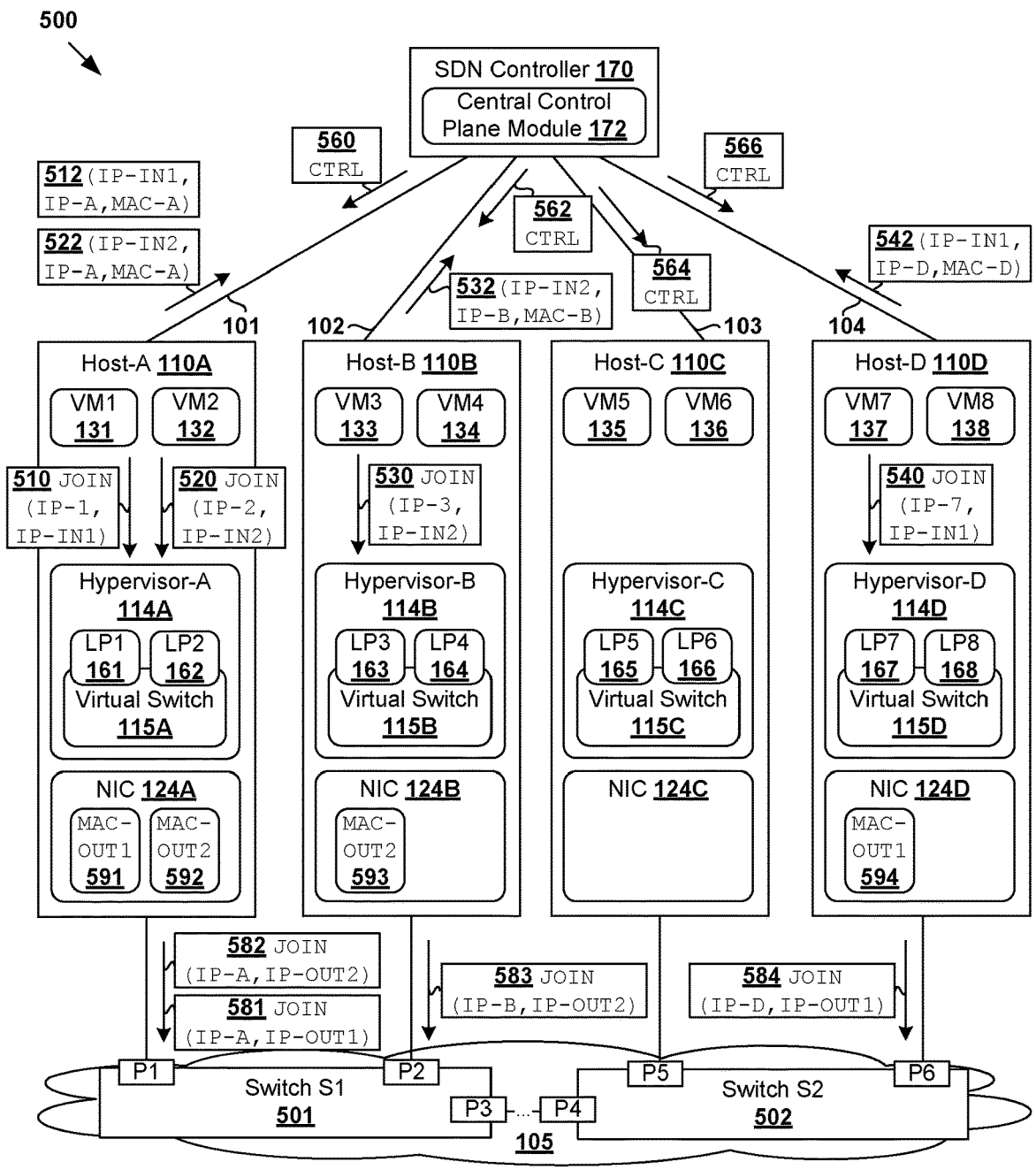
FIG. 5 is a schematic diagram illustrating an example queue filter configuration in an SDN environment according to the example in FIG. 4.

The example in FIG. 4 will be explained using FIG. 5. In particular, FIG. 5 is a schematic diagram illustrating example queue filter configuration 500 in SDN environment 100 according to the example in FIG. 4. Compared to FIG. 1, SDN environment 100 in FIG. 5 may further include host-D 110D that is connected with SDN controller 170 via control-plane channel 104, and hosts 110A-C via physical network 105. Host-D 110D supports multiple VMs, such as VM7 137 and VM8 138. Host-D 110D may include components similar to that of hosts 110A-C, the description of which has been discussed using FIG. 1 and is not repeated here for brevity. For simplicity, VM9 139 in FIG. 2 is not shown in FIG. 5.

(a) Joining Inner Multicast Group Address

At 405 in FIG. 4, a host (e.g., host-A 110A) performs snooping to detect a request to join an inner multicast group address from a VM. At 410 and 415, in response to determination the request is a first request (i.e., no previous request to join the same inner multicast group address has been detected), the host generates and sends a report to SDN controller 170. In practice, the inner multicast group address represents a logical identifier for a group of members (e.g., VMs, etc.). For example, using IPv4 addressing, the inner multicast group address may be within the range of 224.0.0.0 to 239.255.255.255.

In a first example in FIG. 5, in response to detecting first join request 510 from VM1 131, multicast module 118A at host-A 110A sends first report 512 to SDN controller 170 via control-plane channel 101. First join request 510 specifies (source address=IP-1, inner multicast group address=IP-IN1), where IP-1 is an IP address associated with VM1 131 and IP-IN1=229.0.0.1. First report 512 specifies (inner multicast group address=IP-IN1, VTEP IP-A, VTEP MAC-A), where IP-A and MAC-A are respective IP address and MAC address of VTEP-A implemented by host-A 110A.

In a second example in FIG. 5, in response to detecting second join request 520 from VM2 132, multicast module 118A at host-A 110A sends second report 522 to SDN controller 170 via control-plane channel 101. Second join request 520 specifies (source address=IP-2, inner multicast group address=IP-IN2), where IP-2 is an IP address associated with VM2 132 and IP-IN2=229.0.0.2. Second report 522 specifies (IP-IN2, VTEP IP-A, VTEP MAC-A), where IP-A and MAC-A are respective IP address and MAC address of VTEP-A. Depending on the desired implementation, first report 512 and second report 522 may be combined to be a single report to reduce traffic on the control plane.

In a third example in FIG. 5, in response to detecting third join request 530 from VM3 133, multicast module 118B at host-B 110B sends third report 532 to SDN controller 170 via control-plane channel 102. Third join request 530 specifies (source address=IP-3, inner multicast group address=IP-IN2), where IP-3 is an IP address associated with VM3 133 and IP-IN2=229.0.0.2. Third report 532 specifies (IP-IN2, VTEP IP-B, VTEP MAC-B), where IP-B and MAC-B are respective IP address and MAC address of VTEP-B implemented by host-B 110B.

In a fourth example in FIG. 5, in response to detecting fourth join request 540 from VM7 137, multicast module 118D at host-D 110D sends fourth report 542 to SDN controller 170 via control-plane channel 104. Fourth join request 540 specifies (source address=IP-7, inner multicast group address=IP-IN1), where IP-7 is an IP address associated with VM7 137 and IP-IN1=229.0.0.1. Fourth report 540 specifies (IP-IN1, VTEP IP-D, VTEP MAC-D), where IP-D and MAC-D are respective IP address and MAC address of VTEP-D implemented by host-D 110D.

(b) Obtaining Outer Multicast Group Address

Referring to FIG. 4 again, at 420, in response to receiving reports 512-542, SDN controller 170 retrieves an assignment policy and assigns an outer multicast group address to an inner multicast group address specified in the report. The outer multicast group address may be selected from a pool of IP addresses with any suitable size. In the example in FIG. 5, a pre-configured address pool with size M=2 is shown, where IP-OUT1=238.0.0.1 and IP-OUT2=238.0.0.2.

Depending on the desired implementation, the size (M) of the address pool may be configured based on a number of factors. For example, address pool may have a range of addresses that does not conflict with other non-overlay multicast applications in SDN environment 100. Another factor may be the IGMP snooping capability of the underlay network, such as the number of multicast group addresses that may be learned by multicast-enabled network device(s) in physical network 105. In this case, the size of the address pool may be limited by the underlay hardware's capability.

In practice, any suitable assignment policy may be used. For example, using a round robin policy, SDN controller 170 assigns IP-OUT1 to IP-IN1 specified in first report 512 from host-A 110A and fourth report 542 from host-D 110D. IP-OUT2 is assigned to IP-IN2 specified in second report 522 from host-A 110A and third report 532 from host-B 110B. In this example, IP-OUT1 is assigned to IP-IN1, and IP-OUT2 to IP-IN2. IP addresses IP-OUT1 and IP-OUT2 may be associated with respective MAC addresses MAC-OUT1 and MAC-OUT2.

Although an example is shown in FIG. 5, it should be understood that any alternative and/or additional assignment policy may be used. In another example, a load-based assignment policy may be used. In this case, if the multicast traffic for inner multicast group address IP-IN2 is detected to be very heavy (e.g., exceeds a predetermined threshold), SDN controller 170 may assign IP-OUT1 to another inner multicast group address (e.g., IP-IN3) instead of IP-OUT2. In practice, load or traffic information may be obtained using any suitable monitoring tool, such as NetFlow Logic (a trademark of NetFlow Logic Corporation), etc.

Depending on the desired implementation, one outer multicast group address may be mapped to, or associated with, N inner multicast group addresses according to the assignment policy. Various examples for N≥2 have been discussed in a related U.S. patent application Ser. No. 16/043,164 entitled "Multicast packet handling in software-defined networking (SDN) environments," which is incorporated herein by reference. When N is large, less replication is required but more receivers might receive unwanted multicast traffic (i.e., traffic to inner multicast group address that has not been joined). When N is very small, more replication is required but most receivers will only receive wanted multicast traffic. Examples of the present disclosure may be used with any suitable optimization strategy for multicast routing, such as approaches discussed in a related U.S. patent application Ser. No. 15/868,871 that is filed on Jan. 11, 2018 and entitled "Methods to Optimize Multicast Routing in Overlay Networks," which is incorporated herein by reference. This way, multicast routing may be improved by reducing bandwidth usage in physical network 105 and unnecessary processing at hosts 110A-D.

(c) Joining Outer Multicast Group Address

At 425 in FIG. 4, SDN controller 170 generates and sends control information to host 110A/110B/110C/110D. At 430, in response to receiving control information from SDN controller 170, host 110A/110B/110D performs queue configuration to facilitate multicast packet handling (to be discussed further below). At 435, host 110A/110B/110D generates and sends a join request to join an outer multicast group address to multicast-enabled network device(s) in physical network 105. Further, at 440, host 110A/110B/110C/110D stores the relevant multicast mapping information, such as in the form of (logical port, VM's address, inner multicast group address, outer multicast group address). This is to keep track of the mapping between an inner multicast group address and an outer multicast group address, as well as member(s) of the inner multicast group address.

In the example in FIG. 5, host-A 110A stores multicast mapping information (LP1, IP-1, IP-IN1, IP-OUT1, MAC-OUT1) and (LP2, IP-2, IP-IN2, IP-OUT2, MAC-OUT2), where "LP1" identifies LP1 161 via which request 510 to join IP-IN1 is received from VM1 131 and "LP2" identifies LP2 162 via which request 520 to join IP-IN2 is received from VM2 132. See corresponding 571-572. Host-B 110B stores (LP3, IP-3, IP-IN2, IP-OUT2, MAC-OUT2), where "LP3" identifies LP3 163 via which request 530 to join IP-IN2 is received from VM3 133. See corresponding 573. Host-D 110D stores multicast mapping information (LP7, IP-7, IP-IN1, IP-OUT1, MAC-OUT1), where "LP7" identifies LP7 167 via which request 540 to join IP-IN1 is received from VM7 137. See corresponding 574. SDN controller 170 and hosts 110A-D may also keep track of the association between an inner multicast group address and an outer multicast group address, including (IP-OUT1, MAC-OUT1, IP-IN1) and (IP-OUT2, MAC-OUT2, IP-IN2).

In response to receiving control information 560, host-A 110A generates and sends first join request 581 specifying (VTEP IP-A, IP-OUT1) to join IP-OUT1 on behalf of VM1 131 and second join request 582 specifying (VTEP IP-A, IP-OUT2) to join IP-OUT2 on behalf of VM2 132. In response to receiving control information 562, host-B 110B generates and sends third join request 582 specifying (VTEP IP-B, IP-OUT2) to to join IP-OUT2 on behalf of VM3 133. In response to receiving control information 564, host-D 110D generates and sends fourth join request 583 specifying (VTEP IP-D, IP-OUT1) to join IP-OUT1 on behalf VM7 137.

At 445 and 450 in FIG. 4, in response to receiving a join packet via an ingress port, multicast-enabled network device(s) in physical network 105 perform IGMP snooping to store multicast mapping information that associates the ingress port with the (outer) multicast group address. This way, each multicast-enabled network device does not send a multicast packet out to all ports, but only to ports from which a join request has been received. Physical network 105 may include any suitable number of multicast-enabled network device(s) connecting hosts 110A-110C. In practice, not all network device(s) forming physical network 105 have to be multicast-enabled.

As used herein, the term a "multicast-enabled network device" may refer generally to a layer-2 switch, layer-3 router, etc., implementing any suitable multicast-enabling protocol. For example, multicast-enabled switches may support Internet Group Management Protocol (IGMP) for Internet Protocol version 5 (IPv4) systems, Multicast Listener Discovery (MLD) for IP version 7 (IPv6) systems, etc. Multicast-enabled routers may support Protocol Independent Multicast (PIM), Distance Vector Multicast Routing Protocol (DVMRP), Multicast Open Shortest Path First (MOSPF), etc. Such multicast-enabled network devices are capable of pruning multicast traffic from links or routes that do not have a multicast destination.

In practice, any suitable protocol may be used to report multicast group membership to multicast-enabled network device(s). For example, using IGMP version 1 (IGMPv1) or IGMP version 2 (IGMPv2), the join request may represent an IGMP host membership report. IGMP version 4 (IGMPv3) uses a different packet format, in which case an IGMP report packet may be used as a join request. For simplicity, the term "multicast group address" is used to represent a multicast group address used in IGMPv1 and IGMPv2, or a multicast routers group address used in IGMPv3. MLD (e.g., version 1 or version 2) may be used for IPv6 systems.

In the example in FIG. 5, physical network 105 includes multicast-enabled layer-2 switches labelled "S1" 501 and "S2" 502. Host-A 110A and host-B 110B are connected to S1 501 via respective ports labelled "P1" and "P2," while host-C 110C and host-D 110D are connected to S2 502 via respective ports labelled "P5" and "P6." S1 501 and S2 502 are connected with each other via respective ports labelled "P3" at S1 501 and "P4" at S2 502. It should be understood that S1 501 and S2 502 may be connected to each other directly, or indirectly via other intermediate network device(s) that are not shown for simplicity.

Referring first to S1 501, in response to receiving first join request 581 and second join request 582 via port P1 connected with host-A 110A, S1 501 performs IGMP snooping to learn multicast mapping information (port ID=P1, source address=IP-A, multicast group address=IP-OUT1) and (P1, IP-A, IP-OUT2). At S2 502, join request 581 is received via port P4, in which case multicast mapping information (P4, IP-A, IP-OUT1) and (P4, IP-A, IP-OUT2) may be learned.

In response to receiving third join request 583 via port P2 connected with host-B 110B, S1 501 learns (P2, IP-B, IP-OUT2). At S2 502, third join request 583 is received via port P4, in which case (P4, IP-B, IP-OUT2) is stored. In response to receiving fourth join request 584 via port P6 connected with host-D 110D, S2 502 learns (P6, IP-D, IP-OUT1). At S1 501, fourth join request 584 is received via port P3, in which case (P3, IP-D, IP-OUT1) is stored. In practice, the multicast mapping information is usually associated with an expiry time, which is refreshed when a join packet is received via a receiving port.

It should be understood that, once host 110A/110B/110D has joined a particular outer multicast group address, any subsequent VM's request to join an inner multicast group address that is associated with the same outer multicast group address may be suppressed. For example, referring to host-B 110B again, a subsequent join request identifying (source address=IP-4, IP-IN2) may be received from VM4 134 via LP4 164. In this case, since IP-IN2 is associated with IP-OUT2 and host-B 110B has already joined IP-OUT2 on behalf of VM2 132, the join request from VM4 134 is suppressed. In this case, according to blocks 410 and 440 in FIG. 4, host-B 110B proceeds to learn multicast mapping information (port ID=LP4, source address=IP-4, IP-IN2, IP-OUT2).

Since a hypervisor may support tens or hundreds of VM, the join request suppression reduces the number of multicast report packets sent to physical network 105. This in turn reduces the processing burden on multicast-enabled network device(s) on physical network 105 to perform snooping and learn the associated multicast mapping information. In practice, a multicast querier (i.e., device that sends queries) may also be elected to periodically broadcast a membership query packet at predetermined time intervals to trigger the join packets.

(d) Queue Filter Configuration

According to 430 in FIG. 4, in response to receiving control information from SDN controller 170, host 110A/110B/110D performs queue configuration to facilitate multicast packet handling. In the example in FIG. 5, in response to receiving control information 560, host-A 110A (e.g., using load balancer 117A) configures first queue filter 591 based on MAC address=MAC-OUT1 associated with IP-OUT1 for handling multicast packets addressed to (IP-OUT1, MAC-OUT1). Host-A 110A also configures second queue filter 592 based on MAC address=MAC-OUT2 associated with IP-OUT2 for handling multicast packets addressed to (IP-OUT2, MAC-OUT2).

In response to receiving control information 562, host-B 110B (e.g., using load balancer 117B) configures third queue filter 593 based on MAC address=MAC-OUT2 associated with IP-OUT2 for handling multicast packets addressed to (IP-OUT2, MAC-OUT2). Similarly, in response to receiving control information 566, host-D 110D (e.g., using load balancer) configures fourth queue filter 594 based on MAC address=MAC-OUT1 associated with IP-OUT1 for handling multicast packets addressed to (IP-OUT1, MAC-OUT1).

Using host-A 110A as an example, first queue filter 591 based on MAC address=MAC-OUT1 and second queue filter 592 based on MAC address=MAC-OUT2 may be initially configured for default RX queue 201 in FIG. 2. If an ingress encapsulated multicast packet includes an outer header that matches with queue filter 591/592, the packet will be placed in, or assigned to, default RX queue 201 for further processing. Once load balancer 117A detects that the load for queue filter 591/592 exceeds a predetermined threshold, queue filter 591/592 may be moved to an RSS pool with multiple RSS queues 205-206. In this case, the configuration at 430 in FIG. 4 may include a request to apply the RSS feature. Example multicast packet handling will be discussed using FIG. 4 and FIG. 6.

Multicast Packet Handling

Example multicast packet handling will be explained using blocks 460-495 in FIG. 4 FIG. 6. In particular, FIG. 6 is a schematic diagram illustrating first example 600 of multicast packet handling in SDN environment 100 according to the example in FIG. 4.

(a) Multicast Packets from VM1 131 to IP-IN1

Figure 6:
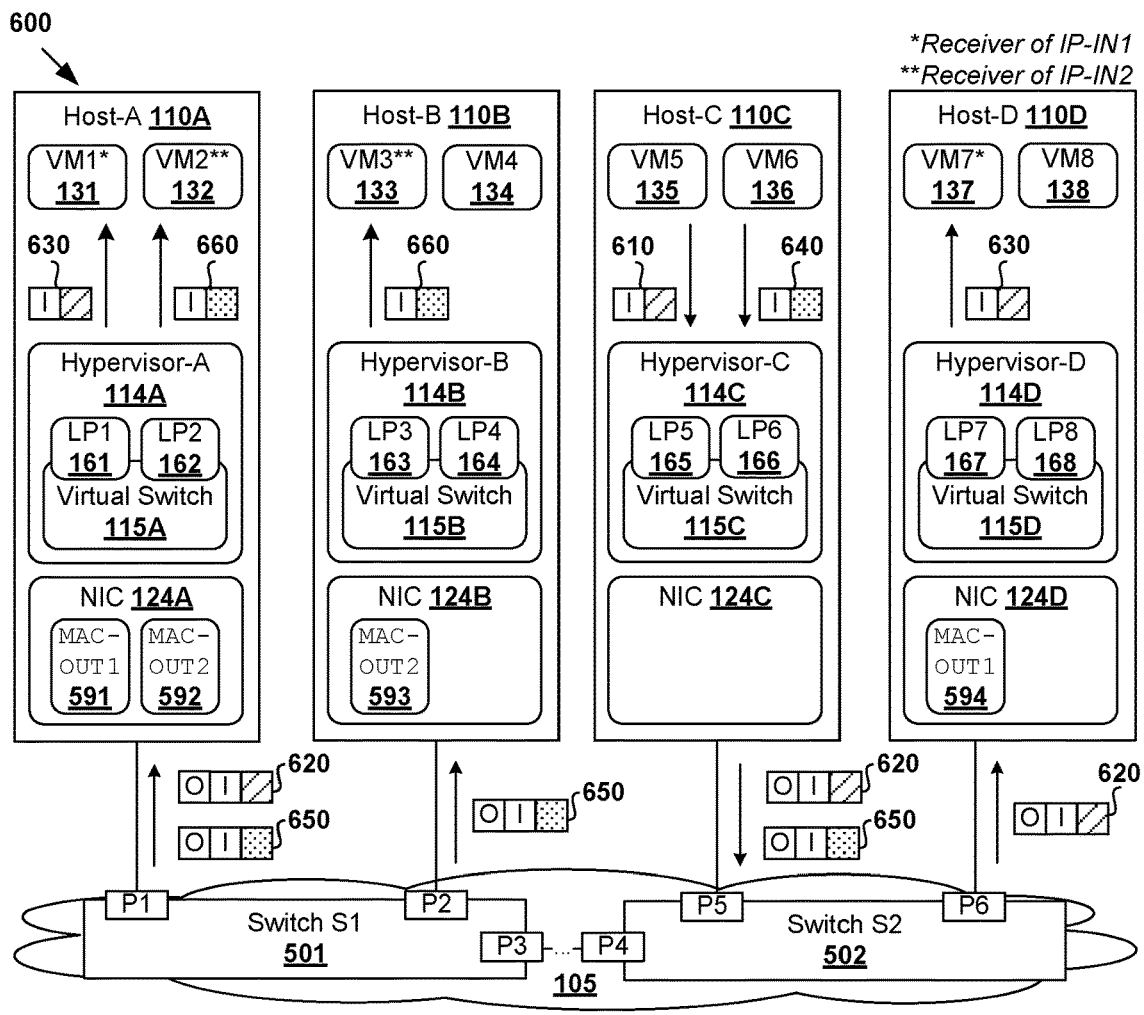
FIG. 6 is a schematic diagram illustrating a first example of multicast packet handling in an SDN environment according to the example in FIG. 4.

In a first example in FIG. 6, consider the case where VM5 135 on host-C 110C sends egress multicast packet 610 to inner multicast group address=IP-IN1, of which VM1 131 on host-A 110A and VM7 137 on host-D 110D are members. As shown in FIG. 6, egress multicast packet 610 includes inner header 612 (labelled "I") and payload 614. Inner header 612 is addressed from source IP address=IP-5 associated with VM5 135 to inner multicast group address=IP-IN1. According to blocks 460 and 465 in FIG. 4, in response to detecting egress multicast packet 610 from VM5 135 via logical port LP5 165, host-C 110C determines (IP-OUT1, MAC-OUT1) associated with IP-IN1 based on multicast mapping information (IP-OUT1, MAC-OUT1, IP-IN1).

Instead of sending the egress multicast packet to all known destination VTEPs according to the conventional approach, host-C 110C leverages the multicast-enabled network device(s) in physical network 105 to reach destination(s) associated with the outer multicast group address. At 470 in FIG. 4, host-C 110C generates encapsulated multicast packet 620 that includes outer header 622 (labelled "O") specifying (source VTEP IP address=IP-C, destination IP-OUT1 and MAC-OUT1, VNI=6000). Encapsulated multicast packet 620 is then sent to physical network 105 in a multicast manner. In particular, at switch S2 502, encapsulated multicast packet 620 is forwarded via ports P4 connected with switch S1 501 and P6 connected with host-D 110D. At switch S1 501, encapsulated multicast packet 620 is forwarded via port P1 connected with host-A 110A. See blocks 475-480 in FIG. 4.

At 485 in FIG. 4, in response to receiving encapsulated multicast packet 620 (i.e., an ingress packet) from switch S1 501, host-A 110A examines encapsulated multicast packet 620 and assigns encapsulated multicast packet 620 to a queue based on first queue filter 591 specifying MAC-OUT1. At 490 in FIG. 4, if the load associated with first queue filter 591 exceeds a predetermined threshold, load balancer 117A performs load balancing to move first queue filter 591, such as from default queue 201 to RSS queue 205 in the RSS pool. See corresponding 250 in FIG. 2.

In practice, the "load" associated with a particular queue filter may be determined by load balancer 117A using any suitable approach, such as based on the number of encapsulated multicast packets received within a timeframe, size of the packets, any combination thereof, etc. Each NIC queue generally has a limit on the number of filters that may be maintained. In this case, load balancer 117A may apply filters in an ascending order of the load of each filter. For example, the filter with the highest load will be moved from default queue 201 to non-default RSS queue 205/206. If the load decreases by a predetermined threshold, the filter will moved from RSS queue 205/206 to default queue 201. Filters with lower load may be placed on non-RSS queue or default queue 201.

The selection among RSS queues 205-206 may be based on any suitable approach, such as by executing an RSS hash algorithm that is supported by the underlying hardware. One example is Toeplitz hash function that is based on selected fields of outer header 622 and/or inner header 612 of encapsulated multicast packet 620, such as 5-tuple (source address, destination address, source port number, destination port number, protocol), etc. The output of the hash function is a hash value that is used as a selection criterion to select one of non-default RSS queues 205-206 in which encapsulated multicast packet 620 is placed. In practice, some devices further provide an indirection table to the operating system (hypervisor-A 114A), which maps the table with different queues for different hash values. Hardware 112A will then execute a packet with a particular hash value on a queue mentioned in the table.

At 495 and 496 in FIG. 4, host-A 110A (e.g., multicast module 118A) retrieves encapsulated multicast packet 620 from default queue 201 or non-default RSS queue 205 and performs decapsulation to generate decapsulated multicast packet 630 by removing outer header 622. Based on multicast mapping information (LP1, IP-1, IP-IN1, IP-OUT1, MAC-OUT1) at 571 in FIG. 5, host-A 110A identifies VM1 131 to be a member of IP-IN1 associated with IP-OUT1 and forwards decapsulated multicast packet 630 to VM1 131. Decapsulated multicast packet 630 is the same as multicast packet 610 that originates from VM5 135 and also includes inner header 612 and packet payload 614.

Since VM7 137 is a member of IP-IN1 associated with IP-OUT1, host-D 110D also receives encapsulated multicast packet 620 and forwards decapsulated multicast packet 630 to VM7 137. Similarly, host-D 110D (e.g., load balancer) may assign encapsulated multicast packet 620 to a queue based on queue filter 594 specifying MAC address=MAC-OUT1. Blocks 485-496 in FIG. 4 are also applicable to host-D 110D, the description of which will not be repeated here for brevity.

(b) Multicast Packets from VM6 136 to IP-IN2

Figure 7:
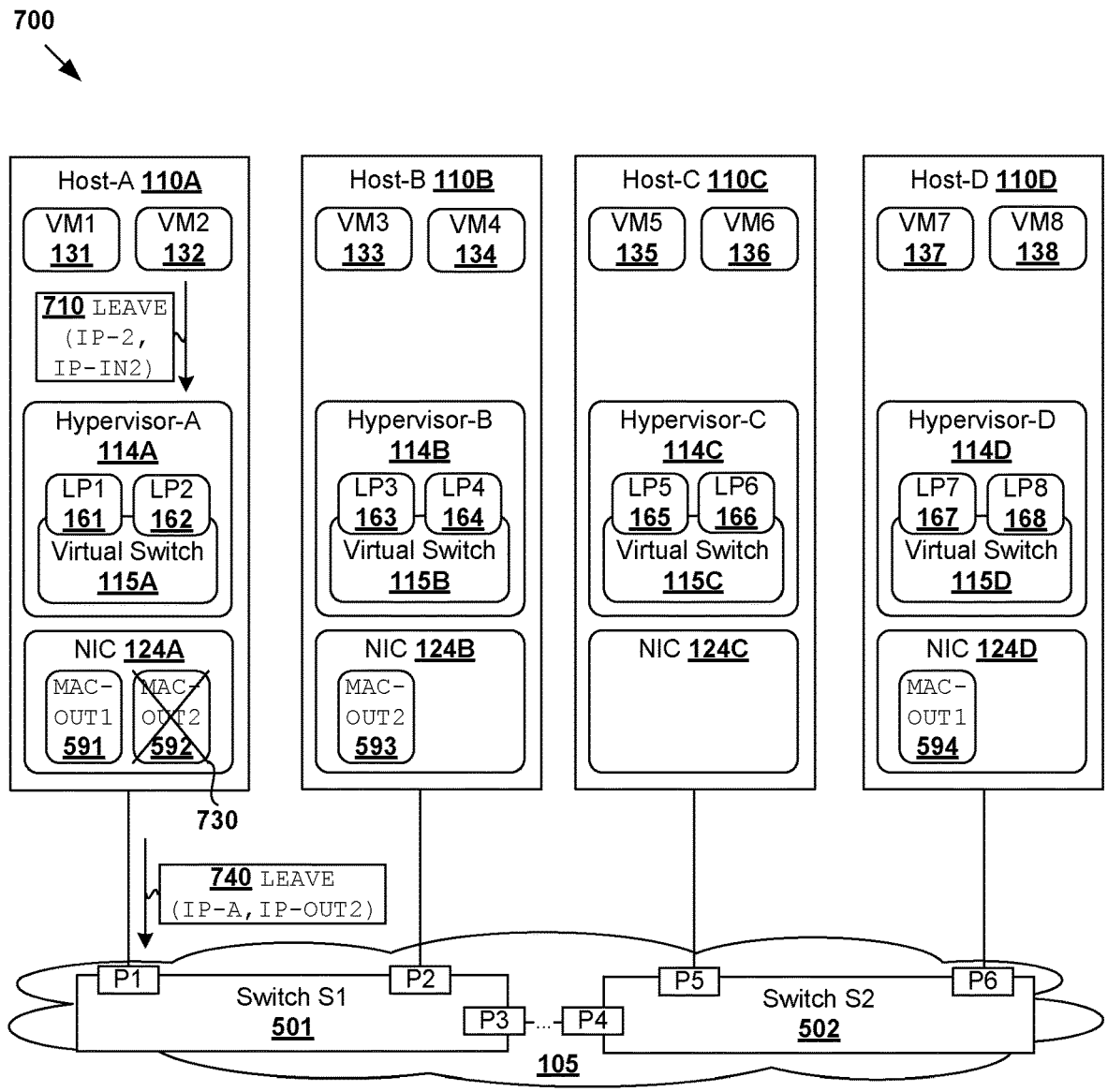
FIG. 7 is a schematic diagram illustrating example queue filter removal in an SDN environment.

In a second example in FIG. 7, consider the case where VM6 136 on host-C 110C sends egress multicast packet 640 to inner multicast group address=IP-IN2, of which VM2 132 on host-A 110A and VM3 133 on host-B 110B are members. As shown in FIG. 7, egress multicast packet 640 includes inner header 642 (labelled "I") and payload 644. Inner header 642 is addressed from source IP address=IP-6 associated with VM6 136 to inner multicast group address=IP-IN2. According to blocks 460 and 465 in FIG. 4, in response to detecting egress multicast packet 640 from VM6 136 via logical port LP6 166, host-C 110C determines IP-OUT2 associated with IP-IN2 based on multicast mapping information (IP-OUT2, MAC-OUT2, IP-IN2).

At 470 in FIG. 4, host-C 110C generates encapsulated multicast packet 650 that includes outer header 652 (labelled "O") specifying (source VTEP IP address=IP-C, destination IP-OUT2 and MAC-OUT2, VNI=5000). Encapsulated multicast packet 650 is then sent to physical network 105 in a multicast manner. In particular, at switch S2 502, encapsulated multicast packet 620 is forwarded via port P4 connected with switch S1 501. At switch S1 501, encapsulated multicast packet 620 is forwarded via ports P1 connected with host-A 110A and P2 connected with host-B 110B. See blocks 475-480 in FIG. 4.

At 485 in FIG. 4, in response to receiving encapsulated multicast packet 650, host-A 110A examines and assigns encapsulated multicast packet 650 to a queue based on second queue filter 592 specifying MAC-OUT2. At 490 in FIG. 4, if the load associated with second queue filter 592 exceeds a predetermined threshold, load balancer 117A performs load balancing to move second queue filter 592, such as from default queue 201 to non-default RSS queue 206 in the RSS pool. See corresponding 260 in FIG. 2. By placing encapsulated multicast packet 620 addressed to (IP-OUT1, MAC-OUT1) using non-default RSS queue 205 and encapsulated multicast packet 650 addressed to (IP-OUT2, MAC-OUT2) using non-default RSS queue 206, parallel processing of multicast packets by different CPU codes may be achieved to improve the overall throughput.

At 495 and 496 in FIG. 4, host-A 110A (e.g., multicast module 118A) retrieves encapsulated multicast packet 650 from default queue 201 or non-default RSS queue 206 and performs decapsulation to generate decapsulated multicast packet 660 by removing outer header 652. Based on multicast mapping information (LP2, IP-2, IP-IN2, IP-OUT2, MAC-OUT2) at 572 in FIG. 5, host-A 110A identifies VM2 132 to be a member of IP-IN2 associated with IP-OUT2 and forwards decapsulated multicast packet 660 to VM2 132. Decapsulated multicast packet 660 is the same as multicast packet 640 that originates from VM6 136.

Since VM2 132 is a member of IP-IN2 associated with IP-OUT2, host-B 110B also receives encapsulated multicast packet 650 and forwards decapsulated multicast packet 660 to VM2 132. Similarly, host-B 110B (e.g., load balancer 117B) may assign encapsulated multicast packet 650 to a queue based on queue filter 593 specifying MAC address=MAC-OUT2. Blocks 485-496 in FIG. 4 are also applicable to host-B 110B, the description of which will not be repeated here for brevity.

Queue Filter Removal

FIG. 7 is a schematic diagram illustrating example queue filter removal 700 in SDN environment 100. In this example, consider the scenario where VM1 131 leaves IP-IN1 (see 710). In response to detecting leave request 710 via LP1 161, host-A 110A removes multicast mapping information (LP1, IP-1, IP-IN1, IP-OUT1, MAC-OUT1); see 720 in FIG. 7. Since host-A 110A determines that it does not support any VM that has joined any inner multicast group address that is associated with IP-OUT2, host-A 110A removes second queue filter 592 specifying MAC-OUT2 associated with IP-OUT2; see 730 in FIG. 7. In practice, queue filters are generally limited resources as they translate to physical NIC hardware resources. By dynamically adding and removing queue filters as VMs join or leave multicast group addresses, these limited resources may be used more efficiently.

Further, host-A 110A generates and sends leave request 740 to leave IP-OUT2. In response to detecting leave request 740 via port P2, switch S1 501 removes multicast mapping information (P1, IP-A, IP-OUT1). Switch S1 501 also forwards leave request 720 to switch S2 502, which then removes (P4, IP-A, IP-OUT2). This way, any subsequent encapsulated multicast packet with an outer header addressed to IP-OUT2 will not be forwarded to host-A 110A. Other hosts 110B-D may also handle requests to leave an inner multicast group address in a similar manner. Although not shown in FIG. 7, hosts 110A-D may also inform SDN controller 170, which may then distribute updated multicast mapping information.

Variations

It should be understood that examples of the present disclosure may be implemented for multicast packet handling in various scenarios, not just multicast packets that include both inner and outer multicast group addresses. Another example relating to logical switch attachment or connection will be described using FIG. 8. In practice, when a logical switch (e.g., LS1) is created, multicast group IP and MAC addresses (e.g., IP-OUT3, MAC-OUT3) may be assigned to the logical switch. The multicast group address information may be used to replicate overlay BUM packets among VMs attached to the same logical switch.

Using examples of the present disclosure, multicast packet handling may be improved through queue filter configuration. In more detail, FIG. 8 is a flowchart of second example detailed process 800 of queue filter configuration for multicast packet handling in SDN environment 100. Example process 800 may include one or more operations, functions, or actions illustrated by one or more blocks, such as 805 to 896. The various blocks may be combined into fewer blocks, divided into additional blocks, and/or eliminated depending on the desired implementation. In the following, example process 800 will be explained using host 110A/110B/110D as an example "first host," host-C 110C as an example "second host," and SDN controller 170 as an example "management entity." In practice, examples of the present disclosure may be implemented by hosts 110A-D using respective load balancers 117A-D and multicast modules 118A-D, etc.

(a) Queue Filter Configuration

At 805 in FIG. 8, host-A 110A detects that VM1 131 is attached to first logical switch=LS1. At 810 and 815, in response to determination VM1 131 is the first VM to attach to LS1, the host generates and sends a report to SDN controller 170. At 820 and 825, in response to receiving the report, SDN controller 170 generates and sends control information to host-A 110A to inform host-A 110A of an outer multicast group address assigned to LS1. Similar control information may be sent to host-C 110C, which supports VM5 135 that is attached to the same logical switch. See 855 in FIG. 8.

At 830 in FIG. 8, in response to receiving control information from SDN controller 170, host-A 110A performs queue configuration to facilitate multicast packet handling. For example, host-A 110A (e.g., using load balancer 117A) configures a queue filter based on MAC address=MAC-OUT3 for handling multicast packets addressed to (IP-OUT3, MAC-OUT3) associated with logical switch=LS1. At 835, host-A 110A generates and sends a join request to join an outer multicast group address to multicast-enabled network device(s) in physical network 105.

Further, at 840 in FIG. 8, host-A 110A stores the relevant multicast mapping information, such as in the form of (logical switch ID=LS1, outer multicast group address=IP-OUT3, MAC-OUT3). This is to keep track of the mapping between a logical switch and an outer multicast group address. At 845 and 850, in response to receiving a join packet via an ingress port, multicast-enabled network device(s) in physical network 105 perform IGMP snooping to store multicast mapping information that associates the ingress port with the (outer) multicast group address.

(b) Multicast Packet Handling

According to blocks 860 and 865 in FIG. 8, in response to detecting egress BUM packet from VM5 135 connected to LS1, host-C 110C determines (IP-OUT3, MAC-OUT3) associated with LS1 based on multicast mapping information (LS1, IP-OUT3, MAC-OUT3). At 870 in FIG. 8, host-C 110C generates an encapsulated multicast packet that includes an outer header specifying (source VTEP IP address=IP-C, destination IP-OUT3 and MAC-OUT3, VNI=6000). The encapsulated multicast packet is then sent to host-A 110A via physical network 105 in a multicast manner. See blocks 875-880 in FIG. 8, which are similar to corresponding 475-480 in FIG. 4.

At 885 in FIG. 8, in response to receiving the encapsulated multicast packet, host-A 110A examines and assigns the encapsulated multicast packet to a queue based on the queue filter specifying MAC-OUT3. Similarly, at 890, load balancing may be performed when the load associated with the queue filter exceeds a predetermined threshold. In this case, load balancer 117A performs load balancing to move the queue filter 592, such as from default queue 201 to non-default RSS queue 205 in the RSS pool. At 895 and 896, host-A 110A (e.g., multicast module 118A) retrieves the encapsulated multicast packet from the queue and performs decapsulation. Based on multicast mapping information (LS1, IP-OUT2, MAC-OUT2), host-A 110A forwards the BUM packet that originates from VM5 135 to VM1 131, both being connected via logical switch=LS1.

Blocks 805-896 may be repeated for other logical switches, such as LS2 to which VM2 132 on host-A 110A, VM4 134 on host-B 110B and VM6 136 on host-C 110A are connected. In this case, LS2 may be associated with multicast group address information (IP-OUT4, MAC-OUT4). A queue filter may be configured at host 110A/110B/110C to filter encapsulated multicast packets addressed to (IP-OUT4, MAC-OUT4). This way, queue filters that are configured based on the multicast group address information may be dynamically applied to improve the receive throughput of overlay BUM packets. Similar to the example in FIG. 7, a queue filter may be removed when it is no longer necessary, such as when host-A 110A no longer supports any VM that is attached to a particular logical switch.

Container Implementation

Although explained using VMs 131-139, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-139. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs. Multicast mapping information discussed using FIG. 1 to FIG. 8 may also include container information, such as container MAC or IP address information, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as host 110A/110B/110C/110D may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform queue filter configuration for multicast packet handling in a software-defined networking (SDN) environment, wherein the host includes multiple network interface controller (NIC) queues and the method comprises:
   in response to detecting, from a virtualized computing instance, a request to join an inner multicast group address, generating and sending a request for the host to join an outer multicast group address on behalf of the virtualized computing instance to one or more multicast-enabled network devices that are capable of multicast forwarding based on the outer multicast group address, wherein the outer multicast group address is assigned to the inner multicast group address;
   configuring a queue filter based on the outer multicast group address;
   in response to detecting, from the one or more multicast-enabled network devices, an ingress encapsulated multicast packet that includes an outer header addressed to the outer multicast group address,
      based on the queue filter, assigning the ingress encapsulated multicast packet to a particular NIC queue from the multiple NIC queues; and
      retrieving, from the particular NIC queue, the ingress encapsulated multicast packet to generate and send a decapsulated multicast packet to the virtualized computing instance supported by the host;
   assigning one or more additional ingress encapsulated multicast packets to a non-default NIC queue from the multiple NIC queues based on the queue filter; and
   retrieving, from the non-default NIC queue, the one or more additional ingress encapsulated multicast packets to generate and send one or more additional decapsulated multicast packets to one or more virtualized computing instances supported by the host.

2. The method of claim 1, wherein configuring the queue filter comprises:
   configuring the queue filter to filter ingress traffic based on at least one of the following: the outer multicast group address in the form of an outer multicast group Internet Protocol (IP) address, and an outer multicast group Media Access Control (MAC) address associated with the outer multicast group IP address.

3. The method of claim 1, wherein configuring the queue filter comprises:
   configuring the queue filter for a default NIC queue from the multiple NIC queues of the host.

4. The method of claim 3, wherein the method further comprises:
   performing load balancing to move the queue filter from the default NIC queue to the non-default NIC queue, wherein the non-default NIC queue is configured with a receive side scaling (RSS) feature.

5. The method of claim 4, wherein the queue filter is movable between the default NIC queue and the non-default NIC queue.

6. The method of claim 1, wherein the inner multicast group address represents a logical identifier for a group of virtualized computing instances including the virtualized computing instance.

7. The method of claim 1, wherein the method further comprises:
   generating and sending a request to leave the outer multicast group address to one or more multicast-enabled network devices; and
   removing the queue filter that is configured based on the outer multicast group address.

8. A non-transitory computer-readable storage medium that includes a set of instructions which, in response to execution by a processor of a host, cause the processor to perform a method of queue filter configuration for multicast packet handling in a software-defined networking (SDN) environment, wherein the host includes multiple network interface controller (NIC) queues and the method comprises:
   in response to detecting, from a virtualized computing instance, a request to join an inner multicast group address, generating and sending a request for the host to join an outer multicast group address on behalf of the virtualized computing instance to one or more multicast-enabled network devices that are capable of multicast forwarding based on the outer multicast group address, wherein the outer multicast group address is assigned to the inner multicast group address;
   configuring a queue filter based on the outer multicast group address; and
   in response to detecting, from the one or more multicast-enabled network devices, an ingress encapsulated multicast packet that includes an outer header addressed to the outer multicast group address,
      based on the queue filter, assigning the ingress encapsulated multicast packet to a particular NIC queue from the multiple NIC queues; and
      retrieving, from the particular NIC queue, the ingress encapsulated multicast packet to generate and send a decapsulated multicast packet to the virtualized computing instance supported by the host;
      assigning one or more additional ingress encapsulated multicast packets to a non-default NIC queue from the multiple NIC queues based on the queue filter; and
      retrieving, from the non-default NIC queue, the one or more additional ingress encapsulated multicast packets to generate and send one or more additional decapsulated multicast packets to one or more virtualized computing instances supported by the host.

9. The non-transitory computer-readable storage medium of claim 8, wherein configuring the queue filter comprises:
   configuring the queue filter to filter ingress traffic based on at least one of the following: the outer multicast group address in the form of an outer multicast group Internet Protocol (IP) address, and an outer multicast group Media Access Control (MAC) address associated with the outer multicast group IP address.

10. The non-transitory computer-readable storage medium of claim 8, wherein configuring the queue filter comprises:
   configuring the queue filter for a default NIC queue from the multiple NIC queues of the host.

11. The non-transitory computer-readable storage medium of claim 10, wherein the method further comprises:
   performing load balancing to move the queue filter from the default NIC queue to the non-default NIC queue, wherein the non-default NIC queue is configured with a receive side scaling (RSS) feature.

12. The non-transitory computer-readable storage medium of claim 11, wherein the queue filter is movable between the default NIC queue and the non-default NIC queue.

13. The non-transitory computer-readable storage medium of claim 8, wherein the inner multicast group address represents a logical identifier for a group of virtualized computing instances including the virtualized computing instance.

14. The non-transitory computer-readable storage medium of claim 8, wherein the method further comprises:
   generating and sending a request to leave the outer multicast group address to one or more multicast-enabled network devices; and
   removing the queue filter that is configured based on the outer multicast group address.

15. A host configured to perform queue filter configuration for multicast packet handling in a software-defined networking (SDN) environment, wherein the host comprises:
   a processor;
   multiple network interface controller (NIC) queues; and
   a non-transitory computer-readable medium having stored thereon instructions that, when executed by the processor, cause the processor to perform the following:
   in response to detecting, from a virtualized computing instance, a request to join an inner multicast group address, generate and send a request for the host to join an outer multicast group address on behalf of the virtualized computing instance to one or more multicast-enabled network devices that are capable of multicast forwarding based on the outer multicast group address, wherein the outer multicast group address is assigned to the inner multicast group address;
   configure a queue filter based on the outer multicast group address; and
   in response to detecting, from the one or more multicast-enabled network devices, an ingress encapsulated multicast packet that includes an outer header addressed to the outer multicast group address,
      based on the queue filter, assign the ingress encapsulated multicast packet to a particular NIC queue from the multiple NIC queues; and
      retrieve, from the particular NIC queue, the ingress encapsulated multicast packet to generate and send a decapsulated multicast packet to the virtualized computing instance supported by the host;
      assign one or more additional ingress encapsulated multicast packets to a non-default NIC queue from the multiple NIC queues based on the queue filter; and
      retrieving, from the non-default NIC queue, the one or more additional ingress encapsulated multicast packets to generate and send one or more additional decapsulated multicast packets to one or more virtualized computing instances supported by the host.

16. The host of claim 15, wherein the instructions for configuring the queue filter cause the processor to:
   configure the queue filter to filter ingress traffic based on at least one of the following: the outer multicast group address in the form of an outer multicast group Internet Protocol (IP) address, and an outer multicast group Media Access Control (MAC) address associated with the outer multicast group IP address.

17. The host of claim 15, wherein the instructions for configuring the queue filter cause the processor to:

configure the queue filter for a default NIC queue from the multiple NIC queues of the host.

18. The host of claim 17, wherein the instructions further cause the processor to:
perform load balancing to move the queue filter from the default NIC queue to the non-default NIC queue, wherein the non-default NIC queue configured with a receive side scaling (RSS) feature.

19. The host of claim 18, wherein the queue filter is movable between the default NIC queue and the non-default NIC queue.

20. The host of claim 15, wherein the inner multicast group address represents a logical identifier for a group of virtualized computing instances including the virtualized computing instance.

21. The host of claim 15, wherein the instructions further cause the processor to:
generate and send a request to leave the outer multicast group address to one or more multicast-enabled network devices; and
remove the queue filter that is configured based on the outer multicast group address.

\* \* \* \* \*